Sept. 29, 1959  E. N. SHAWHAN  2,906,948
DIELECTRIC CONSTANT METER
Filed July 22, 1953  2 Sheets-Sheet 1

*INVENTOR.*
ELBERT NEIL SHAWHAN
BY
ATTORNEYS

United States Patent Office 2,906,948
Patented Sept. 29, 1959

2,906,948
DIELECTRIC CONSTANT METER

Elbert N. Shawhan, Newtown Square, Pa., assignor to Sun Oil Company, Philadelphia, Pa., a corporation of New Jersey Application July 22, 1953, Serial No. 369,630

1 Claim. (Cl. 324—60)

Refractive index is widely used in approximate chemical analysis of transparent liquids. Under certain circumstances, the numerical value of the refractive index, together with other measurable physical quantities, leads to information on the types of chemical bonding present and quantitative estimates of their distribution. Refractive index is frequently used as a check on purity or as a means of identifying samples. It is often used as an empirical parameter in tracing changes in a process. A plot against refractive index is given quantitative significance if samples distributed through the observed range can be analyzed, and refractive index is particularly applicable to rapid analysis of binary mixtures after a calibration curve has been established by independent means.

Dielectric constant is directly related to refractive index, both depending upon the polarizability of the molecules in the medium.

If the expression for molar refraction in terms of refractive index, as given by Lorentz-Lorenz, is compared with the expression for molar polarization in terms of dielectric constant, as given by Debye, it will be evident that the dielectric constant is approximately equal to the square of the index of refraction, when the dipole moment of the molecule is small. For all hydrocarbons and for many other substances this is true so that the relation just stated gives a quite close approximation.

A suitable instrument for measuring capacity, and thereby the dielectric constant of a material, would make it practical to use the dielectric constant in place of refractive index in many applications. Measurements would not be restricted to transparent samples. The absence of optical parts would avoid problems of moisture condensation and maintenance of optical surfaces. The results could be displayed on easily read meters and dials for maximum speed and accuracy of reading without requiring special skill. Such a device would lend itself to automatic control applications wherein a rugged capacity cell could be placed in a stream and the electrical output of the instrument used to operate the control variable.

It is one object of the present invention to provide a meter capable of use for the determination of dielectric constant, particularly of liquid materials, or of effecting control under conditions in which dependence upon dielectric constant is involved.

A further, and still broader object of the invention, is the provision of a means for measuring capacitance, whether or not dielectric constant is involved. In brief, the present invention relates to a device which involves rapid interchange of two capacitors connected in succession at the same point in a detecting circuit used to indicate which capacitor is larger. Drift in the detecting circuit is negligible in the short time required for switching. One capacitor may be a stable, fixed condenser. The other may be provided by a calibrated variable condenser in parallel with the capacity undergoing measurement which may consist of a cell filled with the liquid under test as a dielectric. The variable condenser is set so that the detecting circuit shows no difference between the two capacities. The capacity of the cell may then be read from the dial of the calibrated variable condenser. A high order of precision is possible because of the negligible drift in the detecting circuit.

The foregoing and other objects particularly relating to details of construction and operation will become apparent from the following description, read in conjunction with the accompanying drawings, in which.

Figure 1:
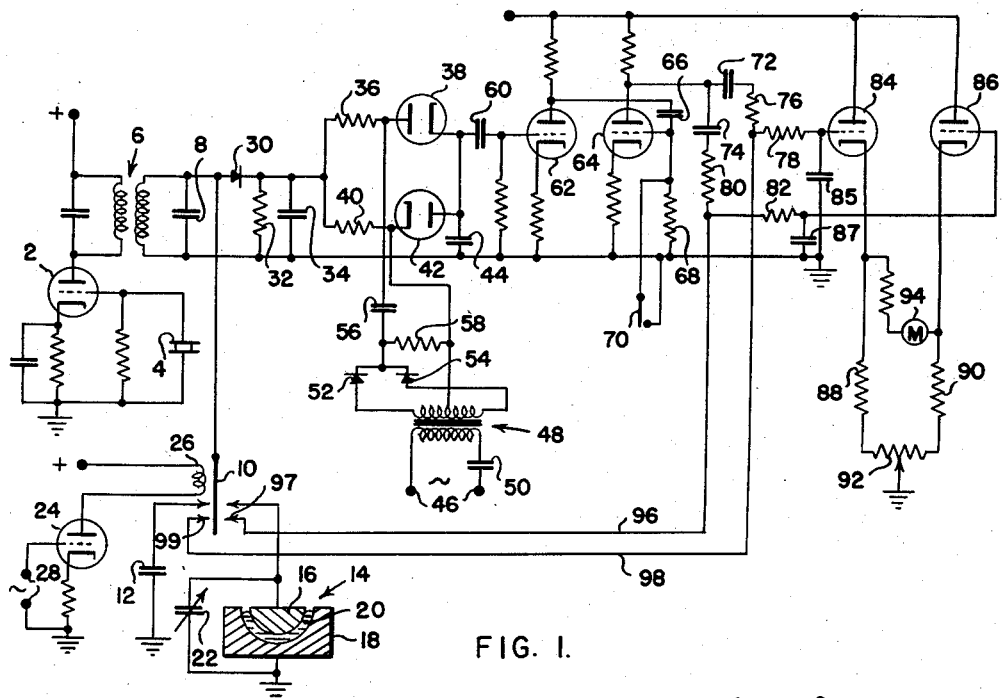
Figure 1 is a circuit diagram showing one embodiment of the invention particularly designed for the measurement of capacity and thereby, indirectly, the measurement of dielectric constant or the equivalent refractive index.

Referring first to Figure 1, there is indicated therein a conventional oscillator comprising the triode 2 with its frequency maintained substantially constant by the crystal 4 which may control oscillations, for example, at a frequency of around 175 kilocycles per second though, as will be evident, the frequency used is not critical. A transformer having loose coupling between its primary and secondary is indicated at 6 and has provided across it a condenser 8. The lower terminals of the secondary and condenser illustrated are grounded. The ungrounded end of the condenser 8 is connected to the armature element 10 of a high speed relay which element is arranged to make alternate contacts to either a high quality air condenser 12 with low temperature coefficient used as a capacity reference or with an arrangement comprising a capacity cell 14 shunted by a calibrated variable condenser 22. The capacity cell 14 comprises conductors 16 and 18 between the approaching surfaces of which there may be located or caused to flow the liquid 20 the characteristics of which are to be determined. It will be evident that the cell may take many forms, for example, a concentric rod and cylinder, parallel plates immersed in the liquid, or, particularly when a small sample is undergoing test, the form of a cup and a cooperating substantially concentric cooperating plate. In any case, the liquid provides the dielectric between a pair of conductive condenser plates. As will be evident, however, if other capacities are being measured such as those of small fixed condensers, such capacities will be located in the circuit in the position of the cell 14. As will presently appear, the combined capacities of the cell 14 and the condenser 22 which are in parallel are, in the operation of the apparatus, made equal to the capacity of the condenser 12. Each of these is in parallel with the condenser 8 and the total capacity provided is so chosen that the circuit including the secondary of the radio frequency transformer 6 is tuned to a point on the steep portion of a resonance curve. Under such conditions, maximum sensitivity is attained.

The relay-operating coil 26 is driven desirably at the commercial supply frequency, for example, 60 cycles, through connection in the anode-cathode circuit of a triode 24, to the grid of which the alternating potential is supplied from terminals 28. With suitable low voltage alternating supply, the tube 24 serves to provide control of the relay in rectangular wave fashion, with rapid switching from one alternative position to the other, the tube during successive half cycles of the alternating grid potential operating at saturation or cut off.

The high frequency tuned circuit feeds a detecting arrangement comprising the diode 30 and the parallel arrangement of resistance 32 and capacity 34. A typical form of the wave appearing across the capacity 34 is shown at A in Figure 3, the amplitude differences between successive half cycles resulting from capacity difference between the standard condenser 12 and the condensers 14 and 22. During the switching cycle of the armature 10 there is a brief interval during which the switch contacts are open. This results in the spikes on the square wave shown at A. To the ungrounded terminal of the capacity 34 there is connected a synchronous switching arrangement having as its particular object the blanking of transients.

Figure 3:
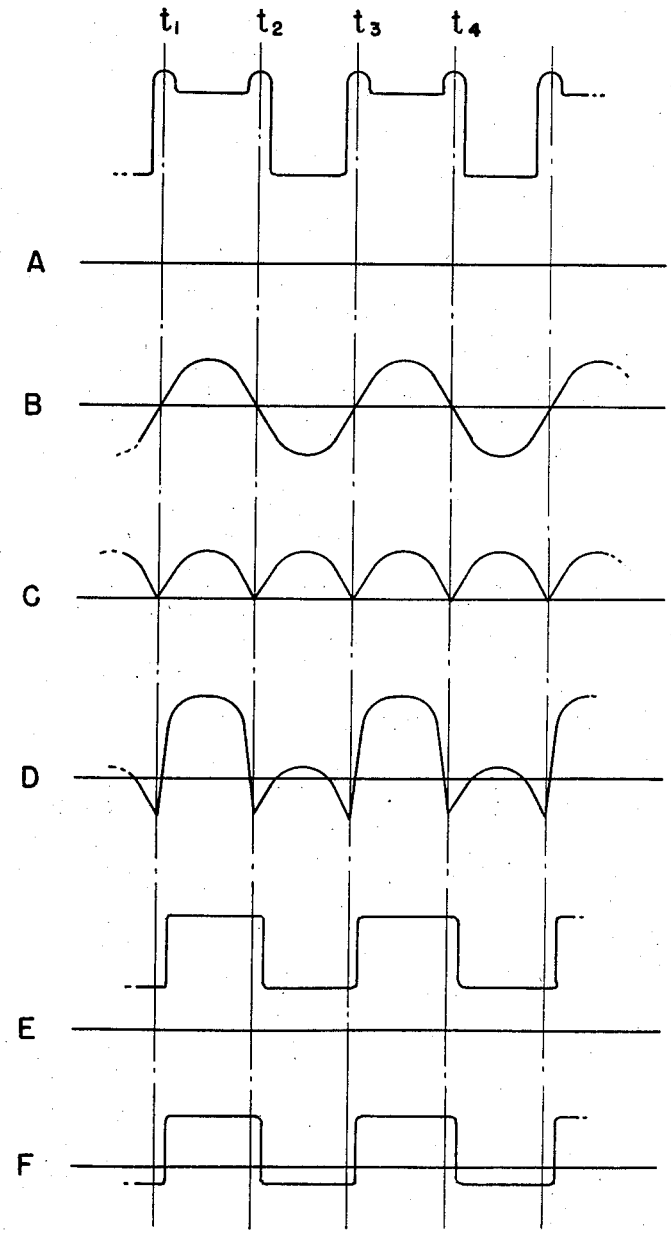
Figure 3 is a showing of the wave forms appearing at various points in the circuit diagram of Figure 1.

The circuit involved comprises the arrangement of diodes 38 and 42, with the anode of the former connected to the condenser 34 through resistance 36 and the cathode of the latter connected to the condenser 34 through the equal resistance 40. The cathode of diode 38 and the anode of diode 44 are connected together and to the ungrounded terminal of a condenser 44 the capacity of which must be small enough to permit it to follow the modulation on the radio frequency due to the switching by the relay at 10. The synchronous operation is effected from the alternating supply terminals 46 at the commercial frequency which is supplied at the terminals 28. The waveform at these terminals is shown at B in Figure 3. It will be noted that the phase relations of the various waves shown in Figure 3 are indicated by vertically extending time lines $t_1$, $t_2$, $t_3$ and $t_4$. A transformer 48 is connected across the input terminals in series with a phase adjusting capacity 50. The secondary of the transformer 48 is center tapped as indicated to provide full wave rectification through the diodes 52 and 54, the anodes of which are connected to the ends of the secondary winding of the transformer. In the present instance, the alternating component of the full wave rectifying circuit is used, the direct component flowing through the resistance 58 connected between the cathode terminals of the diodes and the center tap of the transformer secondary. The form of the wave appearing across the resistance 58 is shown at C in Figure 3, the left-hand end of the resistance 58 being positive. The alternating ripple is fed through condenser 56 to the anode of diode 38. The cathode of diode 42 is connected to the center tap of the transformer secondary. There is thus applied to the diodes a ripple at double the frequency of the supply and having the usual wave shape characteristic of full wave rectification, i.e., sine wave half cycles which in their negative excursions provide a pointed waveform. The form of the wave appearing between the anode of diode 38 and ground is shown at D in Figure 3. When the anode of diode 38 is positive, and the cathode of diode 42 is negative, the diodes are conductive to pass the signal. On the other hand, when the negative excursions of the waveform are applied to the anode of diode 38, the diodes are non-conductive. The negative excursions are of relatively short duration but are sufficient to provide non-conductive condition of the diodes during the occurrence of the transient disturbances due to the switching at 10. The phase adjustment capacity at 50 is set so as to secure the blanking of the diodes during the durations of these transient disturbances.

The result of the foregoing is to provide at the ungrounded terminal of condenser 44 a signal having a D.C. component and a rectangular wave component corresponding to the modulation of the high frequency signal. This wave is shown at E in Figure 3. The direct component is blocked by condenser 60 and the rectangular wave is delivered to the grid of a triode 62 which, together with a second triode 64, provides an amplifier, the coupling from the anode of triode 62 to the grid of triode 64 being through the condenser 66. The form of the wave appearing at the grid of triode 64 is shown at F in Figure 3. The phase of the rectangular wave just mentioned depends upon the capacity which is greater, either that of the condenser 12, or that of the parallel arrangement of cell 14 and condenser 22. The waveforms shown in Figure 3 appear when the capacity of condensers 14 and 22 is smaller than the capacity of the condenser 12. When the capacity of the condenser 12 is the smaller, the waves shown at A, D—F in Figure 3 will be displaced by 180 degrees and, when the capacities are equal, the waves A, D—F level out. To provide indications of this relationship, the amplifier output is subjected to synchronous rectification. The output is delivered through condenser 72 and resistors 76 and 78 to the grid of a triode 84, and is also supplied through condenser 74 and resistors 80 and 82 to the grid of a triode 86. The triodes 84 and 86 are in cathode follower arrangements with the resistances 88 and 90 and the portions of potentiometer resistance 92 on opposite sides of its grounded adjustable contact. A meter 94 is connected between the cathodes of these triodes. Condensers 72 and 74 are of equal capacitance, resistors 76 and 80 are of equal resistance, and resistors 78 and 82 are of equal resistance, though the equality of these values is not particularly critical. The junction of resistors 80 and 82 is connected through line 96 with a contact 97 of the relay 10. The junction of resistors 76 and 78 is similarly connected through line 98 with a relay contact 99. From the standpoint of the low frequency signals appearing at these last mentioned contacts, the relay armature 10 is effectively grounded through the low inductance of the secondary of the transformer 6. Accordingly, during operation, the resistor junction points which have been mentioned are alternately grounded, preventing during their grounding the existence of signals flowing toward the grids of the triodes 84 and 86. Condensers 85 and 87 accordingly accumulate charges which will render one or the other more positive depending upon the phase of the signal appearing at the grid of triode 62. The condensers 85 and 87 are of relatively large capacity and, accordingly, serve as effective grounds for radio frequency signals reaching these condensers. On the other hand, the radio frequency signals are not grounded at the contacts 97 and 99 because of the presence of the resistances 76, 78, 80 and 82.

The apparatus is originally set by the short circuiting at switch 70 of the grid resistor 68, the contact of potentiometer 92 being then adjusted to secure a zero reading of meter 94. With the circuit then in normal operating condition, with switch 70 open, the meter 94 will indicate, by the direction of its reading from zero, which of the parallel condenser arrangements has the larger capacity. Adjustment of calibrated condenser 22 to secure a zero reading will then give a measure of the capacitance at 14, by indicating equality of the sum of the capacities at 22 and 14 with that of the standard condenser 12. The result is that rapid measurements may be made of any unknown capacity at 14, provided either by the cell or some other capacity to be measured.

Figure 2:
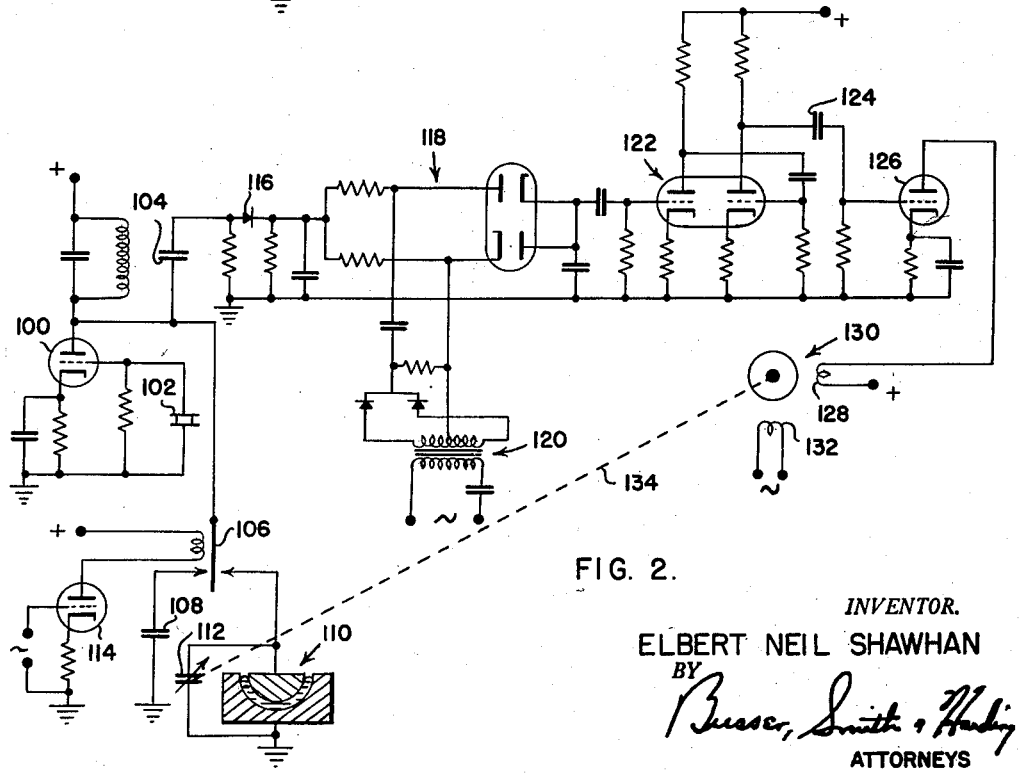
Figure 2 is a similar wiring diagram but showing, in particular, a self-balancing type of apparatus which is also adaptable for control operations.

Figure 2 shows an alternative form of circuit which is different from that of Figure 1 in various respects but involves the same principle of eliminating drift in the measuring circuit by rapidly substituting a standard and unknown capacitor for each other at the same point in a tuned circuit.

In Figure 2 there is provided an oscillator comprising the triode 100 and the crystal 102. As long as the anode circuit of this oscillator is on the inductive side of resonance, the circuit will oscillate. As tuning takes place toward the capacitative side, the amplitude of oscillation will decrease and oscillations will finally cease. The anode of triode 100 is connected to the armature 106 of a relay similar to that involved in Figure 1 but with contacts corresponding to 97 and 99 absent or not used. This relay is driven as in Figure 1 from the alternating current supply through the triode 114 to provide a square wave output. Switching is effected between the standard fixed condenser 108 of the same type as condenser 12 and the parallel arrangement of the calibrated variable condenser 112 and the capacitance which is to be measured consisting of a cell 110 or some other capacity device. A signal is delivered from the anode of triode 100 through condenser 104 and through rectifier 116 and the transient blanking circuit indicated at 118 supplied with a ripple voltage from transformer 120, these arrangements corresponding to those in Figure 1 and, thus, requiring no further description. The output from the transient blanking portion of the circuit is delivered through amplifier 122 and condenser 124 to the grid of a triode 126 in the anode-cathode circuit of which there is provided one phase winding of a two-phase reversible motor 130, the other phase winding of which is indicated at 132 and provided with current from the alternating supply. As shown in Figure 2, the motor 130 drives the variable condenser 112 through a connection indicated at 134 which desirably contains reduction gearing, not shown.

Differences between the capacities switched into the circuit by relay 106 will give rise, as described in connection with Figure 1, to a rectangular wave signal the phase of which will depend upon which is larger. This signal applied to the winding 128 and will produce rotation of the motor 130 in one direction or the other, depending upon the phase of the current supplied to winding 128 as compared with that supplied to winding 132, such as to change the capacity of condenser 112 to secure equality of the alternately switched capacities. Accordingly, this arrangement provides automatic adjustment of the condenser 112 so that the value of the unknown capacity may be determined merely by reading the calibrated scale associated with condenser 112.

The arrangement of Figure 2 lends itself to automatic control if there is no connection between the motor 130 and the variable condenser 112, the motor 130 being used to control a variable in the system which will affect the capacity present at 110 by, for example, modifying the constitution of the liquid in a cell there provided. In such case, the condenser 112 would be set at some desired control point whereupon automatic control would be effected to secure equality of the capacities alternately switched into the circuit. It will be evident that such an arrangement is of broad application, there being possible the control through motor 130 of any variable in a system which may give rise to a change in the capacity existing at 110, whether by change of the dielectric constant of some medium or by change of spacing of condenser plates, which change may be due to a variable such as temperature, pressure, force, displacement or the like.

What is claimed is:

In combination, a pair of reactances to be compared, a circuit having an output affectable by a reactance, switching means for rapidly alternately connecting said reactances to said circuit to provide from the circuit an output having a phase relationship relative to that of switching depending upon the relative values of said reactances, means for blanking out transients due to the switching, the last mentioned means comprising a full wave rectifier providing a ripple output at double the switching frequency and means responsive to said ripple output blocking the output from said circuit during periods of existence of said switching transients, and means responsive to said phase relationship.

References Cited in the file of this patent
UNITED STATES PATENTS

| | | |
|---|---|---|
| 1,932,337 | Dowling | Oct. 24, 1933 |
| 2,471,033 | Greeley | May 24, 1949 |
| 2,505,072 | Sunstein | Apr. 25, 1950 |
| 2,576,772 | Bernet et al. | Nov. 27, 1951 |
| 2,639,386 | Karpeles | May 19, 1953 |
| 2,689,329 | Zimmerman | Sept. 14, 1954 |
| 2,747,095 | Boucke | May 22, 1956 |
| 2,756,390 | Albersheim | July 24, 1956 |
| 2,838,378 | Shawhan | June 10, 1958 |